No. 853,674. PATENTED MAY 14, 1907.
W. BONUS.
CARRIAGE FOR HARVESTERS.
APPLICATION FILED SEPT. 17, 1906.
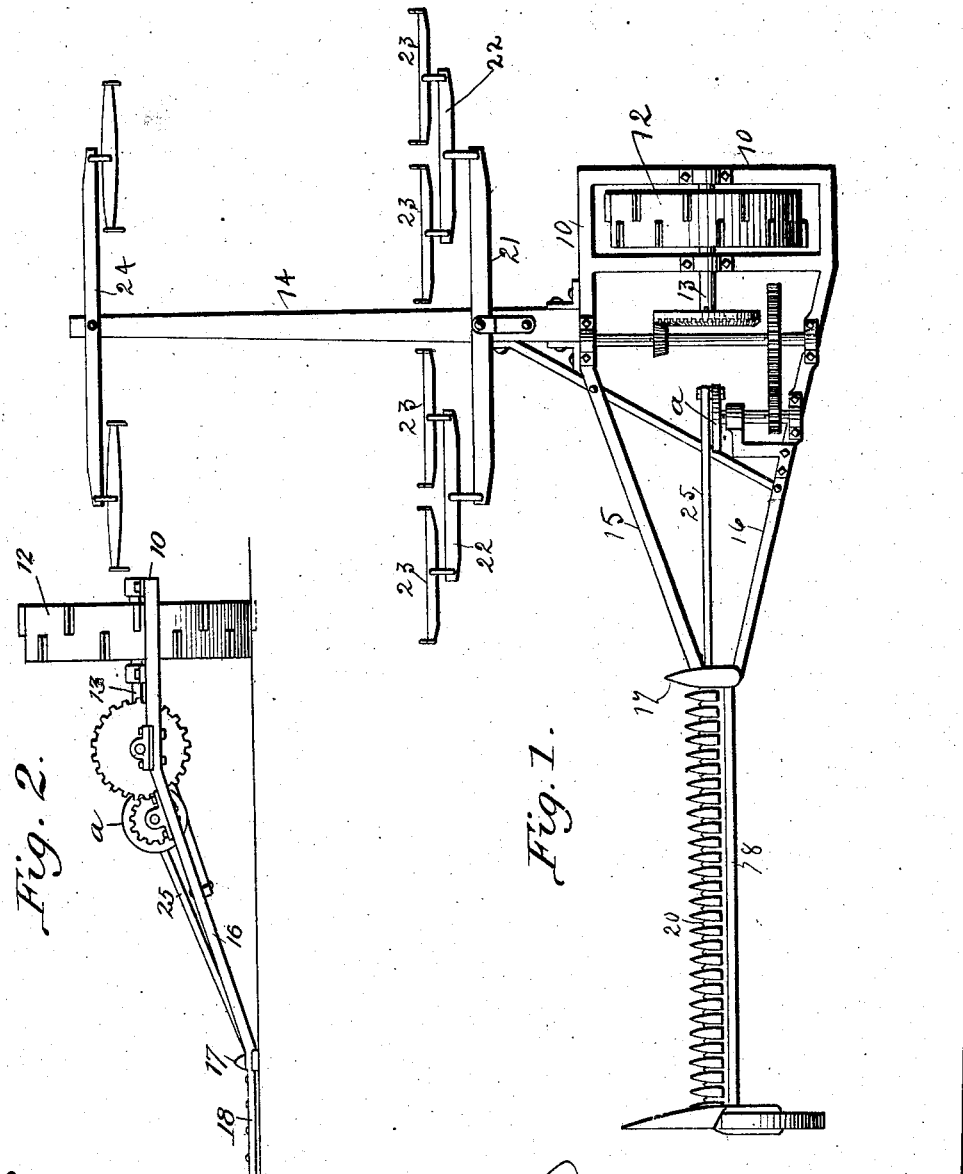
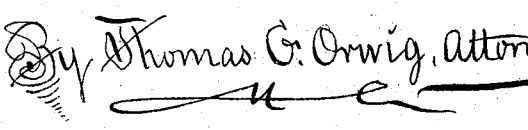

UNITED STATES PATENT OFFICE.

WILLIAM BONUS, OF ORIENT, IOWA.

CARRIAGE FOR HARVESTERS.

No. 853,674.    Specification of Letters Patent.    Patented May 14, 1907.

Application filed September 17, 1906. Serial No. 335,025.

*To all whom it may concern:*

Be it known that I, WILLIAM BONUS, a citizen of the United States, residing at Orient, in the county of Adair and State of Iowa, have invented a new and useful Improvement in Carriages for Harvesters, of which the following is a specification.

My object is to provide a simple, strong, durable and efficient carriage for a harvester adapted to be operated by two horses hitched abreast on the opposite sides of a pole that is distant from the cutter bar far enough to allow the two horses on the inside of the pole to walk between the standing grain and the pole as they advance the machine in the field and to diminish the maximum of power required for cutting a given width of standing grain as the machine is advanced by four horses abreast at the side of the standing grass or grain and in advance of the machine.

My invention consists in the arrangement and combination of parts as hereinafter set forth, pointed out in my claims and illustrated in the accompanying drawings in which:

Figure 1 is a top view that shows the positions of all the elements relative to each other and the master or drive wheel and the reciprocating cutter bar of a harvester. Fig. 2 is a rear view of the carriage.

The numeral 10 designates a carriage frame in which is mounted a drive wheel 12 on a rotatable axle 13. To the front of the frame 10 is fixed a pole 14 as shown, or in any suitable way, as required to transmit power from horses hitched to the machine for advancing the machine and actuating cutting mechanism combined with the frame by means of a lateral and downwardly inclined auxiliary frame consisting of bars 15 and 16 fixed to the frame 10 and to a cutter bar support 17 at their converging lower ends as shown, or in any suitable way, as required to increase the distance between the main frame and the cutter bar support 17 and a bar 18.

The space between the cutter bar 18 and the drive wheel may vary from fifty to eighty five inches as required to allow two horses to be hitched inside of the pole 14 and to walk between the standing grain and the pole and to prevent side draft when there are two horses hitched on the outside of the pole and the four horses abreast of each other. In no instance heretofore has there been sufficient space between the standing grain and the pole extending forward from the machine to allow more than one horse to be on the inside of the pole and consequently draft-equalizers have been combined with harvesters to prevent the side draft incident to machines to which two horses could not be hitched on each side of the pole without letting the inner horse trample the standing grain as the machine was advanced to cut grain. By making the auxiliary frame that extends at right angles from the pole fixed to the front of the main frame and its connection with the cutter bar support rigid the friction of the cutters in the grain and the drive wheel on the ground is equally divided and consequently the power applied to the pole by two horses hitched abreast on each side of the pole dispenses with the use of any auxiliary device in the form of a draft equalizer.

A common evener 21 is pivoted to the pole 14 and double-trees 22 connected therewith and swingletrees 23 to the doubletrees in a common way. A four-horse neck yoke 24 is connected with the front of the pole in a common way.

A reciprocating pitman 25 is connected with the cutter bar 18 and power and motion transmitted thereto from the drive wheel 12 by the gear wheels connected therewith as shown, or in any suitable way, as required for cutting grass or grain when the machine is advanced in the field.

Having thus set forth the purposes of my invention and the arrangement and combination of all the parts the practical operation and utility thereof will be obvious.

What I claim as new and desire to secure by Letters-Patent, is:

1. A carriage frame for harvesters comprising a main frame, an auxiliary frame at the grainward end of the main frame composed of bars inclined downward and outward and converging toward each other and a cutter bar support attached to the ends of said bars, for the purposes stated.

2. A carriage frame for harvesters comprising a main frame, an auxiliary frame at the grainward end of the main frame composed of bars inclined downward and outward and converging toward each other, a cutter bar support fixed to the ends of said bars and a pole fixed to the main frame, to operate as set forth for the purposes stated.

3. A carriage for harvesters comprising a main frame, an axle, a wheel fixed to the axle, a pole fixed to the front of the main frame, an auxiliary frame fixed to the main frame to project laterally and downward therefrom, and a cutter bar support fixed to the lower end of the auxiliary frame, and means for hitching two horses abreast on each side of the pole, to operate as set forth, for the purposes stated.

WILLIAM BONUS.

Witnesses:
   J. F. KINGLEY,
   D. G. WILEY.